United States Patent
Stevens

(10) Patent No.: US 6,419,177 B2
(45) Date of Patent: Jul. 16, 2002

(54) SEAT BELT PRETENSIONER

(75) Inventor: Bruce A. Stevens, Oakland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/777,388

(22) Filed: Feb. 5, 2001

Related U.S. Application Data

(60) Provisional application No. 60/180,270, filed on Feb. 4, 2000, and provisional application No. 60/180,271, filed on Feb. 4, 2000.

(51) Int. Cl.$^7$ .............................................. B60R 22/46
(52) U.S. Cl. ....................................................... 242/374
(58) Field of Search ........................ 242/374; 280/806; 297/478, 480

(56) References Cited

U.S. PATENT DOCUMENTS

| | | | |
|---|---|---|---|
| 4,750,759 A | 6/1988 | Escaravage | 280/806 |
| 4,932,603 A | 6/1990 | Yamanoi et al. | 242/374 |
| 5,222,994 A | 6/1993 | Hamaue | 242/374 |
| 5,397,075 A | 3/1995 | Bahr | 242/374 |
| 5,588,608 A | 12/1996 | Imai et al. | 242/374 |
| 5,641,131 A | 6/1997 | Schmid et al. | 242/374 |
| 5,697,571 A | 12/1997 | Dybro et al. | 242/374 |
| 5,839,686 A | 11/1998 | Dybro et al. | 242/374 |
| 5,853,135 A | 12/1998 | Dybro et al. | 242/374 |
| 5,899,399 A | 5/1999 | Brown et al. | 242/374 |
| 5,906,328 A | * 5/1999 | Hamaue et al. | 242/374 |
| 5,944,350 A | 8/1999 | Grabowski et al. | 280/806 |
| 5,967,440 A | 10/1999 | Marshall | 242/374 |
| 6,000,655 A | 12/1999 | Coppo | 242/374 |
| 6,036,274 A | 3/2000 | Kohlndorfer et al. | 297/480 |
| 6,139,058 A | 10/2000 | Bohmler | 280/806 |

FOREIGN PATENT DOCUMENTS

| | | |
|---|---|---|
| DE | 32 31 509 A1 | 3/1984 |
| DE | 100 10 379 A 1 | 9/2000 |

* cited by examiner

Primary Examiner—John M. Jillions
(74) Attorney, Agent, or Firm—Dinnin & Dunn, P.C.

(57) ABSTRACT

A pretensioner 10 for a seat belt 12 utilizes a strap 34 coiled about a clutch assembly 46 wherein the clutch assembly 46 is in normal operation of a vehicle, rotatable about a portion of a webbing reel shaft 16. The pretensioner 10 contains a first passage 20 and a second passage 22 for the respective containment of the clutch assembly 46 and an actuator 32, wherein each passage is formed perpendicular and in volumetric intersection with the other. The pretensioner 10 also contains a gas generant composition 30 in combustive communication with the actuator 32. Upon ignition, the gas pressure produced by the pyrotechnic 30 propels the actuator 32 into the strap 34, thereby effecting rotary advancement of the clutch assembly 46 and the shaft 16, and thus pretensioning the seat belt 12 wound about a spool 13 of a seat belt retractor 14, wherein the spool 13 is rotatably engaged with a second portion of the shaft 16 and thus provided in coaxial relation with the clutch assembly 46.

8 Claims, 5 Drawing Sheets

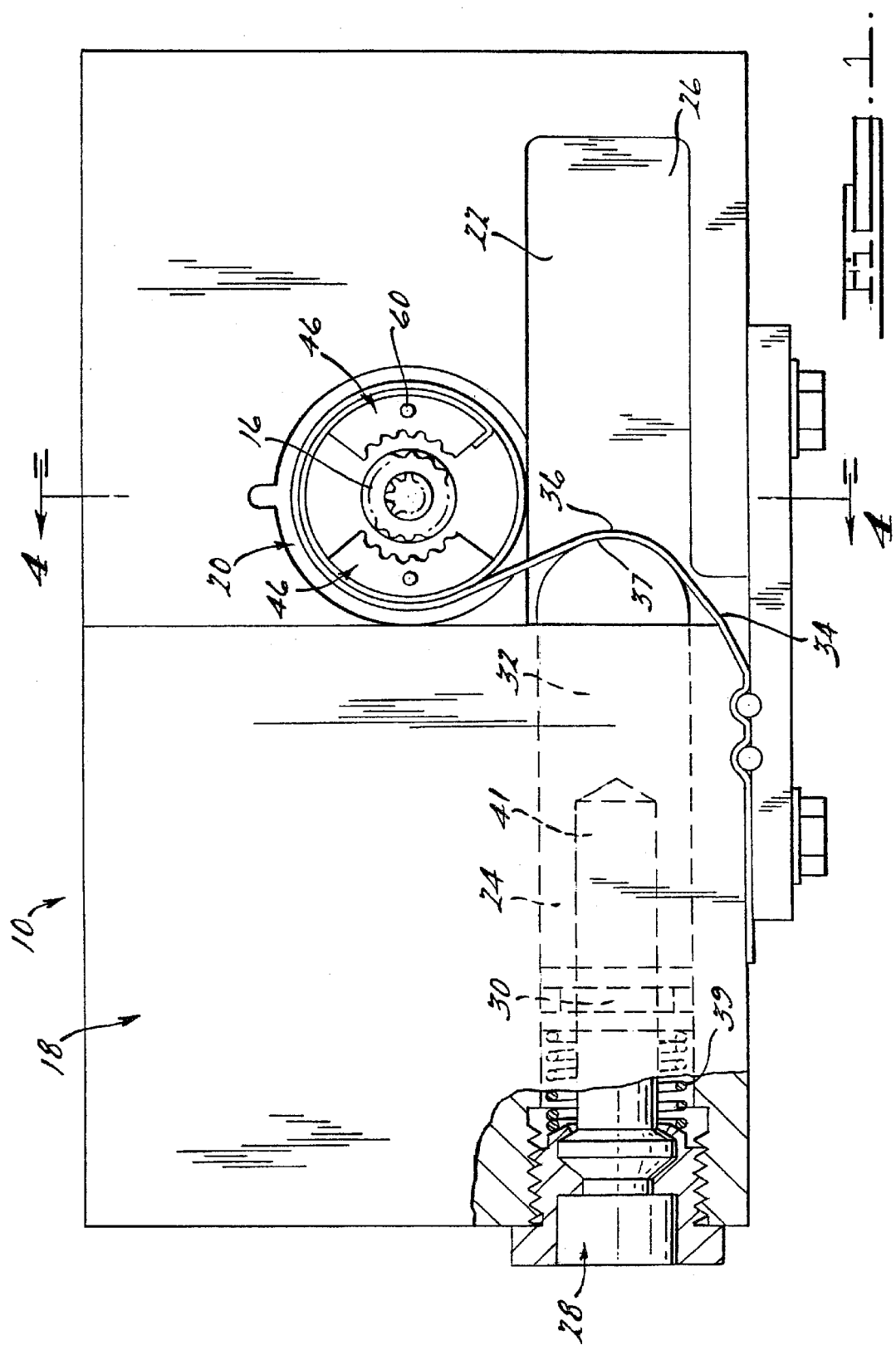

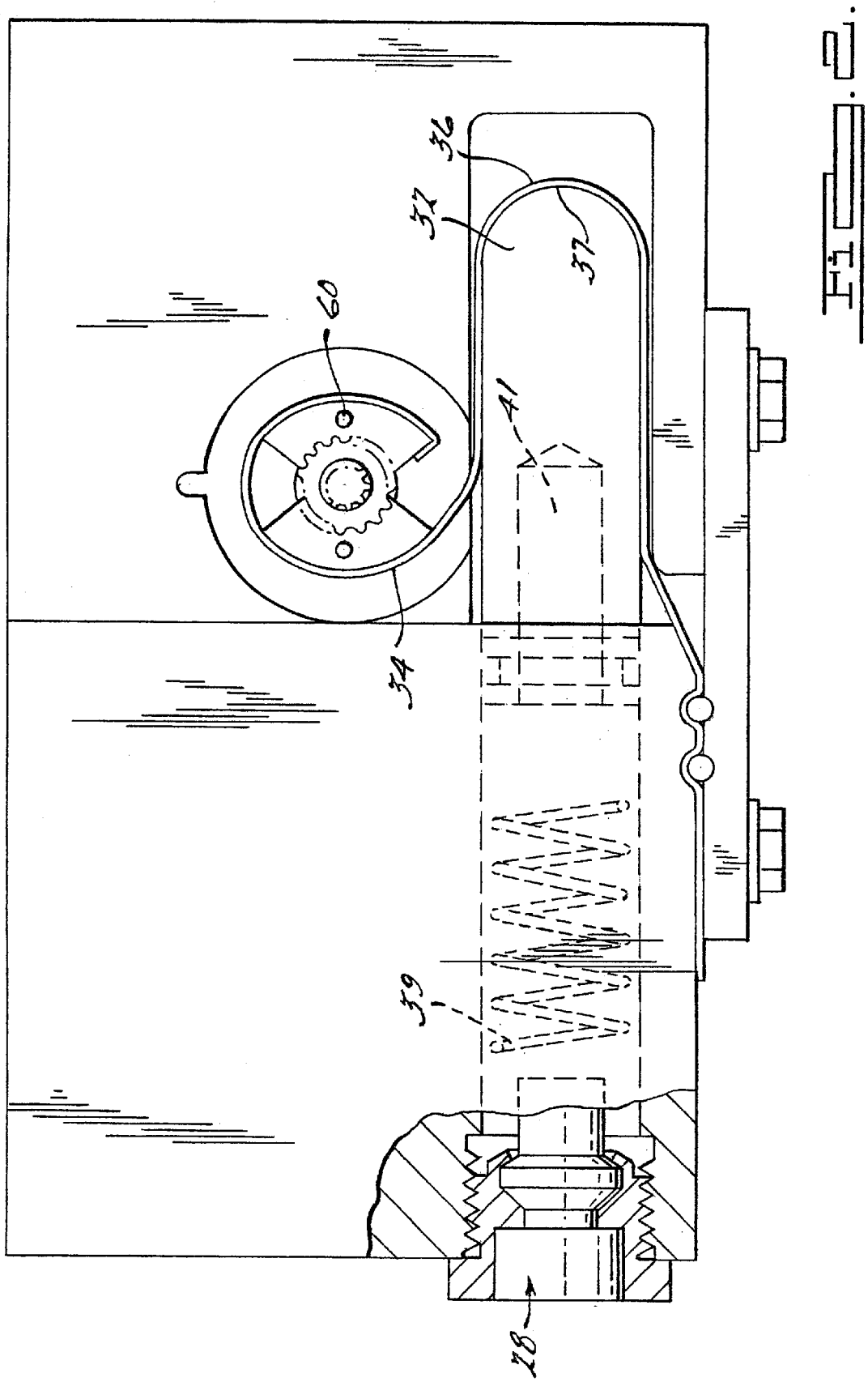

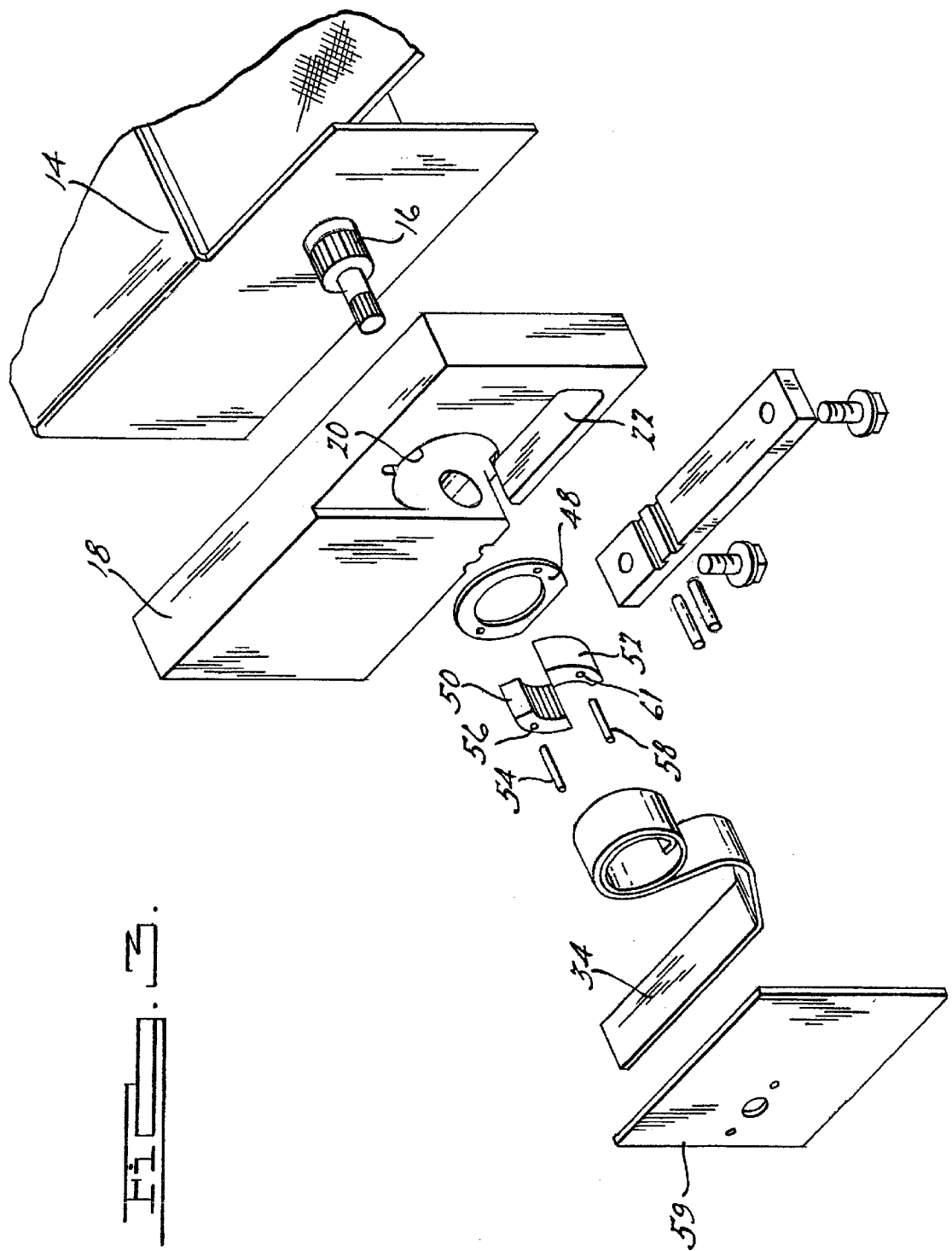

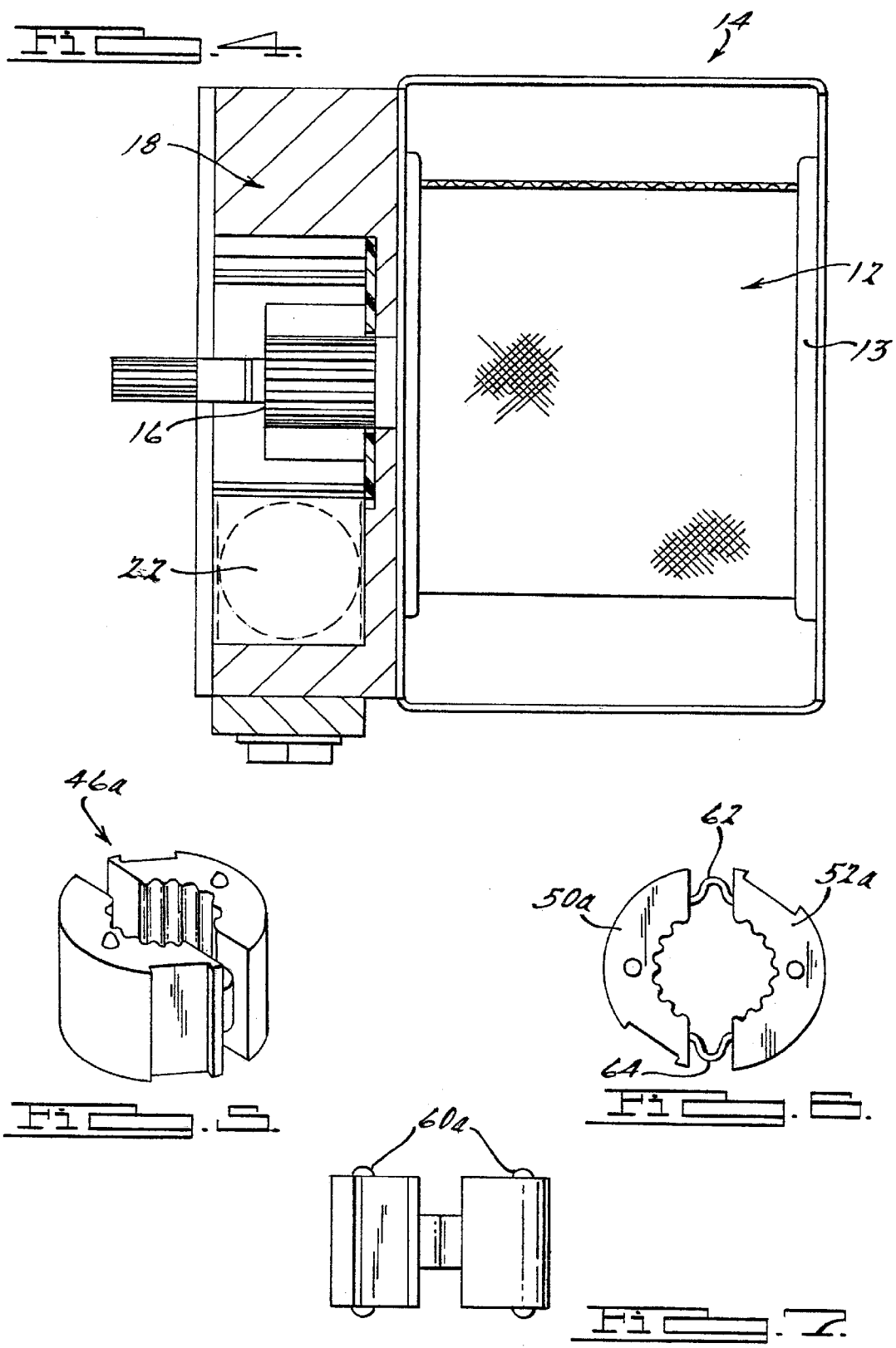

SEAT BELT PRETENSIONER

CROSS-REFERENCE TO RELATED APPLICATIONS

This application claims the benefit of U.S. Provisional Application Ser. Nos. 60/180,270 and 60/180,271, each filed on Feb. 4, 2000.

BACKGROUND OF THE INVENTION

The present invention relates to seat belt pretensioners and, more specifically, to a seat belt pretensioner that incorporates a motion multiplier thereby reducing the actuator stroke requirement.

Seat belt pretensioners remove slack from a seat belt in the event of a collision in order to minimize forward movement of the passenger. While it is known to use pyrotechnic gas generators to operate mechanisms which wind up or otherwise pull in slack in the seat belt during a collision, such known pyrotechnic gas generators are often disposed internally of a seat belt retractor. Thus, the vehicle owner is faced with a significant cost penalty in that the entire pretensioner and retractor assembly must be replaced after activation because of the inability to prevent degradation of the retractor. High-temperature gases tend to abrade interior metal surfaces and produce ash and clinkers that bind up the retraction mechanism.

Another problem with known pretensioners is that they are designed to activate only in severe accidents, for example, accidents that exhibit "G" forces sufficient to activate the vehicle airbags. Safety system designers generally choose such a relatively high activation threshold due to the expense of replacing the entire seat belt retractor and pretensioner assembly after activation. As a result, seat belt pretensioners do not protect passengers in less severe accidents.

A related problem with known pretensioners is that when the pretensioner is activated only in severe accidents, activation is relatively late in the crash sequence. Thus, the pretensioner must rapidly take up slack in the seat belt, sometimes injuring the passenger.

U.S. Pat. No. 5,967,440, herein incorporated by reference, describes a pretensioner and a conventional retractor for a safety belt system. When compared to the seatbelt retractor, the pretensioner is relatively complex and large, thus increasing the weight and spatial requirements of the seatbelt assembly.

U.S. Pat. No. 5,899,399, herein incorporated by reference, describes a state of the art pretensioner. The pretensioner is relatively complex therefore complicating the manufacturing process.

U.S. Pat. No. 5,944,350, herein incorporated by reference, describes a state of the art pretensioner. Again, the pretensioner is relatively large, thus increasing the weight and spatial requirements of the seatbelt assembly.

German Patent No. DE 10010379 A1, herein incorporated by reference, describes a pretensioner having an arcuate path for a multi-piece actuator (a plurality of cylinders) that drives a steel cord wrapped around a webbing reel hub and thereby effects pretensioning of an associated seat belt. The manufacturing of the pretensioner is more complex given the multi-piece actuator and given the arcuate channel that the actuator must traverse Uniformity in channel width and effective sealing becomes more difficult with the use of an arcuate channel. Secondly, a noise reduction means is employed to prevent rattling during normal vehicle operation, thereby increasing manufacturing costs. Furthermore, the joint use of the multi-piece actuator with the steel cord results in a friction loss and a reduction in the load applied to the steel cord by the forward-most cylinder of the actuator. As a result, more force is required to drive the multi-piece actuator and pretension the seatbelt. One solution is described by the use of an intermediate element "43" for facilitating the smooth movement of the rotating elements along the arcuate channel. Consequently, without the use of the intermediate element "43", a more robust pretensioner housing would be necessitated to withstand the relatively greater combustion pressure (produced by a greater amount of propellant) likely necessary to pretension the seatbelt in accordance with customer requirements.

SUMMARY OF THE INVENTION

The aforesaid problems are solved, in accordance with a preferred constructed embodiment of the present invention, by a seat belt pretensioner that utilizes a flat strap as a motion multiplier and a linear channel for movement of a pretensioner actuator, thereby reducing the load or force lost to friction in certain known pretensioners. Given the ease of sealing, the present design also inhibits retractor and occupant exposure to the gases and solids formed upon combustion of a pyrotechnic composition contained within the pretensioner.

In one embodiment of the invention, the pretensioner contains a housing, a clutch assembly that in operation rotatably and constrictively communicates with a webbing reel shaft of a seatbelt retractor, a strap that constrictively exerts a circumferential pressure about the clutch assembly upon pretensioner activation, an actuator that communicates with and is propelled against the strap upon pretensioner activation, a gas generant or pyrotechnic that propels the actuator (or piston), and an initiator that ignites the gas generant upon a signal from an accelerometer or impact sensor, for example. Upon ignition of the gas producing pyrotechnic, the actuator is driven forward in an essentially linear path thereby tightening the strap about the clutch assembly, and thus pretensioning the seat belt wound about a spool in the retractor, wherein the spool and the clutch assembly share the webbing reel retractor shaft as an axis in a preferred embodiment.

Stated another way, a pretensioner 10 for a seat belt 12 utilizes a strap 34 coiled about a clutch assembly 46 wherein the clutch assembly 46 is in normal operation of a vehicle, rotatable about a portion of a webbing reel shaft 16. The pretensioner 10 contains a first passage 20 and a second passage 22 for the respective containment of the clutch assembly 46 and an actuator 32, wherein each passage is formed perpendicular and in volumetric intersection with the other. The pretensioner 10 also contains a gas generant composition 30 in combustive communication with the actuator 32. Upon ignition, the gas pressure produced by the pyrotechnic 30 propels the actuator 32 into the strap 34, thereby effecting rotary advancement of the clutch assembly 46 and the shaft 16, and thus pretensioning the seat belt 12 wound about a spool 13 of a seat belt retractor 14, wherein the spool 13 is rotatably engaged with a second portion of the shaft 16 and thus provided in coaxial relation with the clutch assembly 46.

After use, only the pretensioner and perhaps the retractor shaft need be replaced, obviating the expense of also replacing the retractor or other components of the seat belt retraction mechanism.

Because expense heretofore associated with activation of a pretensioner is significantly reduced, passengers can be given the protection of seat belt pretensioning in even minor accidents. Moreover, a pretensioner that activates in minor collisions will also activate earlier in a severe crash sequence. Earlier activation of the pretensioner permits the pretensioner to operate less aggressively, reducing the possibility of injury caused by the seat belt pretensioner itself.

BRIEF DESCRIPTION OF THE DRAWINGS

FIG. 1 is a diagrammatic elevational view, partially in cross-section, of a replaceable seat belt pretensioner prior to activation, in accordance with the present invention.

FIG. 2 is a second diagrammatic elevational view of a second embodiment, partially in cross-section, of a replaceable seat belt pretensioner after activation;

FIG. 3 is a partially exploded view of the embodiment of FIG. 1, in accordance with the present invention.

FIG. 4 is a cross-sectional view of the pretensioner of FIG. 1 taken along the line A—A.

FIG. 5 is a perspective view of a one-piece injection molded clutch assembly or coupling mechanism, in accordance with the present invention.

FIG. 6 is a top view of the clutch assembly of FIG. 5.

FIG. 7 is a side view of the clutch assembly of FIG. 5;

DESCRIPTION OF THE PREFERRED EMBODIMENT

Figure 8:
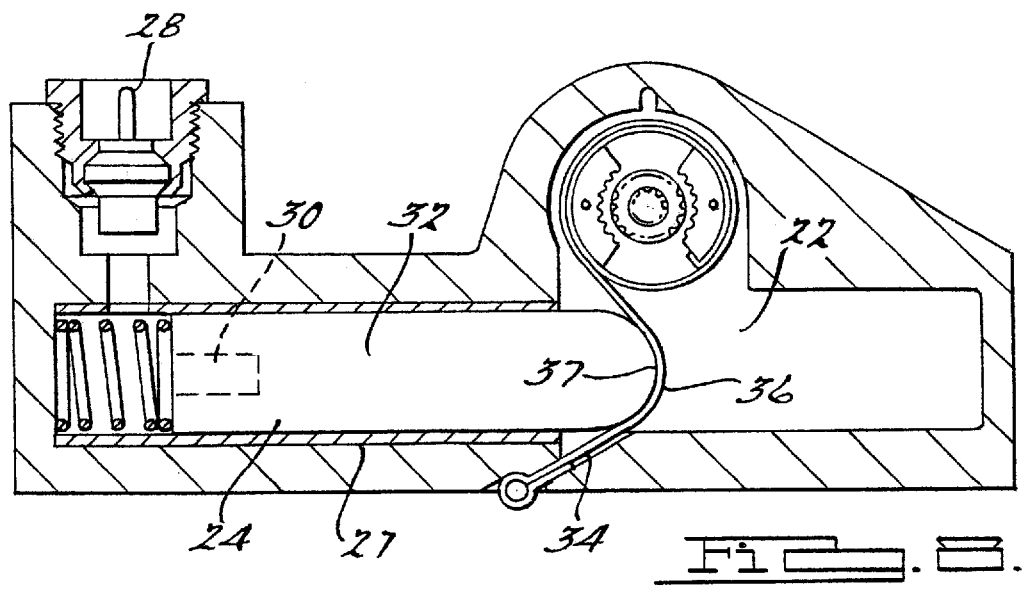
FIG. 8 is another embodiment of the present invention wherein a resilient liner is utilized to strengthen a second passage within the housing.

Referring to the figures, a pretensioner 10 in accordance with a preferred embodiment of the invention is employed to pretension a seat belt 12 wound about a reel 13 of a conventional seat belt retractor 14. "Pretensioning" is generally defined to take up slack in the seat belt in the event of sudden deceleration, or, a collision. A webbing reel retractor shaft 16 extends from the retractor 14 into the pretensioner 10 and thereby cooperates with the pretensioner 10 to tighten the seatbelt 12 in the event of an accident. The pretensioner of the present invention has generic application, for example only, in seatbelt assemblies having seatbelt retractors as described in U.S. Pat. Nos. 4,558,832 and 4,597,546, herein incorporated by reference.

A housing 18 is formed from steel, aluminum, metal alloys, plastic, and/or other known materials suitable for containment of the components described below. The housing 18 is formed with a first circular cylindrical passage 20 volumetrically intersecting a second rectangular cylindrical passage 22, wherein each passage is formed perpendicular to the other and second passage 22 is substantially coextensive with the length of the housing 18. The second passage 22 has a first end 24 and a second end 26. The length of the second passage 22 preferably extends toward second end 26 to permit at least one full turn of the webbing reel shaft 16. It should be noted that given the sealing means within the first end 24, for example o-rings and/or a flared actuator 32, the channel 22 could conceivably extend through the housing 18.

An initiator 28 is fixed (threadedly received, for example) within the first end 24 of the passage 22. As shown in FIG. 1, the initiator 28 ignitably communicates with a gas generant propellant 30 that may if desired be placed proximate to the initiator 28, intermediate of the initiator 28 and the second end 26. An actuator 32, preferably made of a hard resilient material such as plastic, steel, brass and metal alloys and flared at one end to provide a sealing means, is also placed within the first end 24, intermediate of the propellant 30 and the second end 26. The actuator 32 may be formed as a one-piece slug, or as a plurality of segments although other types of actuators may also be implemented. A strap 34, preferably made from steel or some other hard and ductile metal or alloy, is fixed to the housing 18 and passages through an intermediate portion of the passage 22. A flat portion 36 of the strap 34 traverses a cross-section of the passage 22 thus providing a relatively large contact area for flush communication of a leading portion 37 of the actuator 32.

In the embodiment shown in FIGS. 1 and 2, a clutch assembly or coupling mechanism 46 is fixed about the retractor shaft 16 whereby the shaft 16 functions as an axis of rotation. As illustrated, the clutch assembly 46 is fixed to a clip 48 that has a circumference roughly equivalent to that of the first passage 20 and a key corresponding to a female counterpart in the channel 20. Clip 48 is thus key-fitted within the first passage 20 thus preventing rotation upon activation of the clutch assembly 46. The clutch assembly 46 further includes a first segment 50 and a second segment 52. A first shear pin 54 is press-fitted through an annulus 56 of the first segment 50. A second shear pin 58 is press-fitted through an annulus 61 of the second segment 52, whereby shear pins 54 and 58 form slight protrusions through the respective upper and lower surfaces of segments 50 and 52. The protrusions 60 thus function to secure each segment to corresponding annuli in the clip 48. At the other end of the segments, the segments may be held in place by annuli formed within the cover 59, or, another clip may be used to secure the segments from the coiled energy of the strap 34 during normal vehicular operation. When the segments 50 and 52 are fixed in place, the retractor shaft 16 rotates freely of the segments except when the pretensioner is activated.

FIGS. 5–7 illustrate an alternative one-piece injection molding of a clutch assembly 46a. The clutch assembly includes protrusions 60a integral to segments 50a and 52a thereby securing the clutch 46a to clip 48. Segments 50a and 52a are joined together by spring members 62 and 64.

In general, the clutch assemblies illustrated herein are merely exemplary of the many known clutches useful in the art. Accordingly, as used herein, the term "clutch assembly" is meant to apply generically to any clutch component or combination of components that are useful in the seatbelt retractor and pretensioner art. Stated another way, a "clutch assembly" is any component or combination of components that exert a rotatable and circumferential force about the retractor shaft 16 and thus produce a pretensioning or tightening of the belt 12 by winding the associated webbing reel 13. U.S. Pat. Nos. 5,743,480 and 5,222,994, herein incorporated by reference, illustrate known alternatives.

The strap 34 is preferably wrapped at least twice around the periphery of segments 50 and 52, and then hooked in place about an edge of either segment 50 or 52. As the actuator 32 propels the strap 34 to the second end 26 of passage 22, the strap 34 tightens about the clutch assembly 46, shearing pins 54 and 58, and exerting a peripheral force about the clutch assembly 46. The forward motion of the actuator 32 thus results in compression and constriction of the clutch segments 50 and 52 about the retractor axle 16. Rotary movement of the clutch assembly 46 and the webbing reel shaft 16 is thus effected as the associated teeth of the segments 50 and 52 mate with the associated teeth of the shaft 16. Clutch operation therefore results in rotation of the webbing reel 13 of the retractor 14 and tightening or pretensioning of the associated belt webbing 12. Cover 59 encloses the passages 20 and 22 and the components contained therein.

Thus, in accordance with the present invention, the linear movement of the actuator 32 and the strap 34 thus provides a multiplier effect similar to that provided by geared motion multipliers. The present invention, however, simplifies the design and manufacturing of known motion multipliers and yet retains the multiplier advantage of reducing the strap 34 or actuator 32 stroke requirement. Additionally, the substantially sealed housing largely prevents the release of gas, noise, and flame.

In the embodiment shown in FIG. 2, a cup portion 38 may be provided within the actuator 32 and may contain the propellant 30, if desired. The propellant 30 is simply placed within the actuator 32 prior to installation thereof within passage 22, and then ignitably connected to the initiator 28. A spring 39 may if desired be placed between the initiator 28 (or first end 24) and the actuator 32, thereby biasing the leading edge of the actuator 32 against the flat portion 36 of the strap 34.

In one aspect of the invention as shown in FIG. 8, a hard and resilient cylindrical liner 27, steel for example, may if desired be press fitted within the first end 24 to conform to the inner surface of the passage 22, wherein the liner 27 extends up to the circumference of the first cylindrical passage 20, but not in intersecting relationship with the diameter of passage 20. Liner 27 thus enhances the strength of the combustion or pressure chamber 24 (first end 24) therefore permitting the use of lower strength materials for the housing such as aluminum or certain plastics. Material costs may thereby be reduced.

Figure 9:
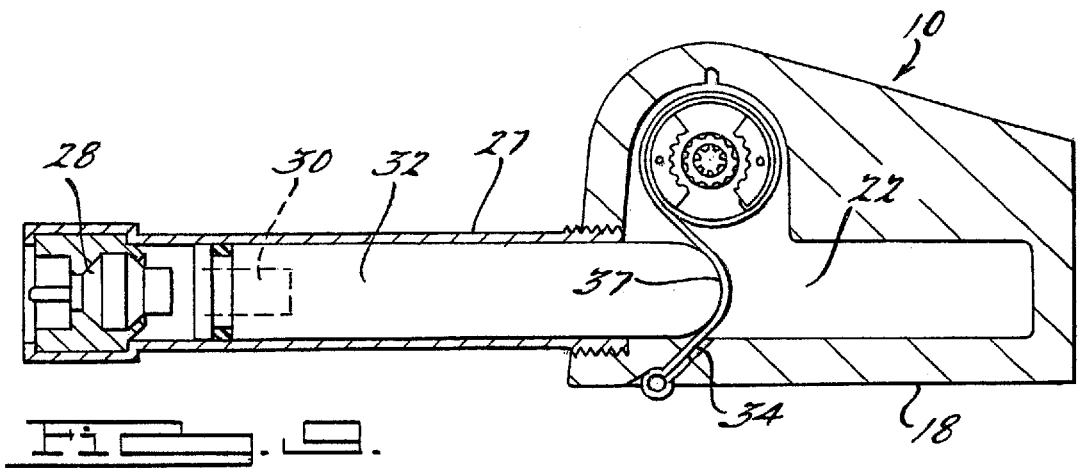
FIG. 9 is yet another embodiment of the present invention wherein a resilient sleeve exterior of the housing is fixed to the second passage within the housing, in axial alignment therewith.

In another embodiment shown in FIG. 9, the steel sleeve insert 27 may alternatively be threadedly received or otherwise fixed to an opening in the exterior of housing 10 in axial alignment with passage 22. The initiator 28 may be threadedly received or otherwise fixed to an opposite end of the sleeve 27. The propellant 30 and the actuator 32 would then be sequentially positioned within the sleeve 27 between the initiator 28 and the housing 10. At the second end of the sleeve 27, the strap 34 and the leading edge of the actuator 32 would again be in flush communication prior to activation of the pretensioner 10. In contrast to the embodiment shown in FIG. 8, the use of the sleeve 27 outside of the second cylindrical passage 22 permits a reduction in the size of the housing 10 and therefore a reduction in materials and weight.

Figure 10:
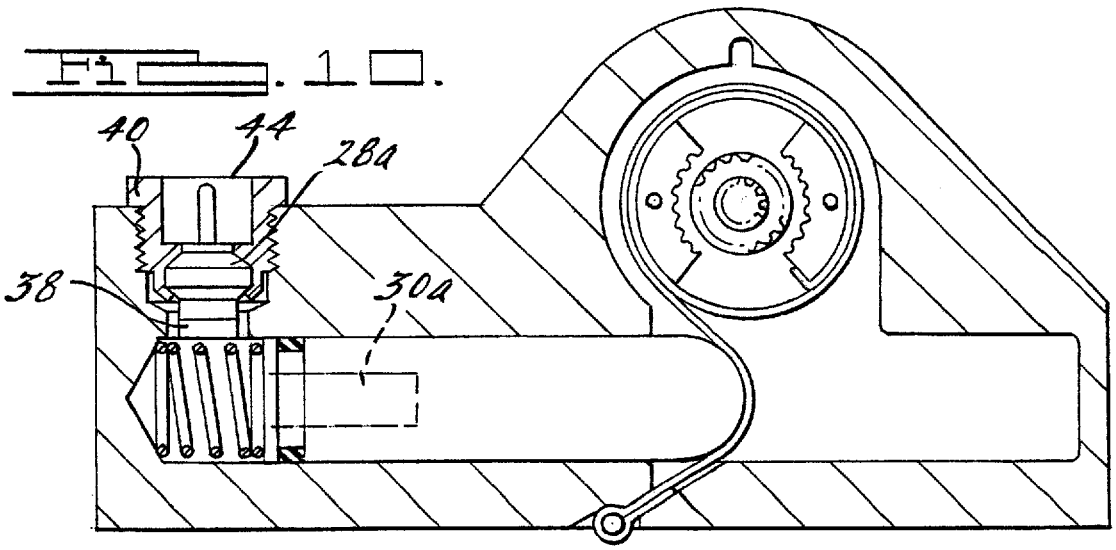
FIG. 10 is yet another embodiment of the present invention containing a gas generator.

As shown in FIG. 10, a pretensioner of the present invention may also utilize an initiator 28a in ignitable communication with a propellant 30a within a gas generator 38, each contained within a third cylindrical chamber 40. The third cylindrical chamber 40 runs parallel to the first cylindrical chamber 20, and perpendicular to the second cylindrical chamber 22. Gas produced from the gas generator is forced through into the second cylindrical passage 22, thus driving the actuator 32 forward.

In operation, electrical contacts 44 on the initiator 28 communicate with a sensor that signals actuation of the pretensioner 10. Once the initiator 28 receives a signal, from an accelerometer for example, the initiator 28 ignites the pyrotechnic gas generant 30. The resultant gas pressure propels the piston or actuator 32 against the strap portion 36, and then forces the actuator 32 and the strap 34 from the first end 24 to the second end 26. As the strap 34 advances, the clutch assembly 46 engages the webbing reel shaft 16 and pretensions the belt 12. Linear movement of the actuator 32 thus effects rotary movement of the shaft 16 thereby pretensioning the seatbelt webbing 12 contained and extending from the retractor 14.

The housing 18, the piston or actuator 32, and the clutch assembly 46 may be die cast from aluminum, steel or suitable alloys thereof. Or, they may be injection molded if plastic material is used. In a preferred embodiment, the actuator 32 and the clutch assembly 46 are formed from hard resilient plastic thereby reducing the weight of the pretensioner 10. The gas generator 38, the gas generant propellant 30, and the initiator 22 are all manufactured or obtained by methods known to those of ordinary skill. The strap 34 may be cut from steel sheet metal for example.

Resultant benefits include simplified manufacturing and retractor preservation. For example, see U.S. Pat. No. 5,899, 399 to Brown et al. Also see U.S. Pat. No. 5,397,075 to Behr, herein incorporated by reference, wherein complicated gear driving mechanisms used to actuate the retractor axle can be replaced by the present invention. When utilized in conjunction with the linear movement of the actuator 32, the strap 34 provides a multiplier effect similar to that provided by geared motion multipliers. The present invention, however, simplifies the design and manufacturing of known motion multipliers and yet retains the multiplier advantage of reducing the strap 34 or actuator stroke requirement. Manufacturing of the present pretensioner is also relatively simple given the straight cylindrical passages. The employment of linear passages not only simplifies manufacturing, but also reduces the friction loss of the applied load on the actuator as compared to arcuate passages, for example. Additionally, the use of linear and cylindrical passages facilitates the sealing of the passages as compared to other geometrically shaped passages. Finally, the essentially sealed housing 10 substantially prevents the release of gas, solids, noise, and flame. After activation of the pretensioner 10, therefore, only the pretensioner 10 need be replaced. In general, all or most of the retractor mechanism 14 will be salvageable after pretensioner use.

Gas generants useful in conjunction with the present invention are gas generants well known to those of ordinary skill in the art. For examples, see U.S. Pat. Nos. 5,035,757, 5,460,668, 5,756,929, and 5,872,329, herein incorporated by reference. These compositions exemplify, but do not limit, useful gas generant compositions.

While the foregoing examples illustrate and describe the use of the present invention, they are not intended to limit the invention as disclosed in certain preferred embodiments herein. Therefore, variations and modifications commensurate with the above teachings and the skill and/or knowledge of the relevant art, are within the scope of the present invention.

I claim:

1. A pretensioner cooperating with a webbing reel shaft of a seatbelt retractor webbing reel, that upon activation pretensions the seatbelt webbing associated therewith, the pretensioner comprising:

a housing having a first circular cylindrical passage volumetrically intersecting a second rectangular cylindrical passage, said passages formed perpendicular to each other, wherein said shaft extends through said first passage and said second passage has a first end and a second end, the second end extending across and past the diameter of the first passage;

a clutch assembly fixed within the first passage wherein said webbing reel shaft axially extends through said clutch assembly;

a strap having a first end fixed to said housing, a portion extending across a section of said second passage, and a second end coiled about and fixed to said clutch assembly;

an actuator positioned within the first end of said second passage for tensioning said strap upon pretensioner activation; and a gas generant composition, ignitable to release sufficient force to drive the actuator through said second passage to the second end thereof, thereby effecting a tensioning of the strap and a peripheral force about the clutch assembly, and then a simultaneous rotary advancement of the clutch assembly, the webbing reel shaft, and the webbing reel, and thus winding the reel and tensioning the seatbelt webbing thereon.

2. The pretensioner of claim 1 wherein said actuator is a one-piece piston.

3. The pretensioner of claim 1 wherein said actuator contains a gas generant composition and thereby also functions as a gas generator.

4. The pretensioner of claim 1 further comprising a resilient cylindrical liner extending up to the circumference but not within the diameter of the first passage, for strengthening the first end of the second passage.

5. The pretensioner of claim 1 further comprising a gas generator for containment of the gas generant composition.

6. A pretensioner cooperating with a webbing reel shaft of a seatbelt retractor webbing reel, that upon activation pretensions the seatbelt webbing associated therewith, the pretensioner comprising:

a housing having a first circular cylindrical passage volumetrically intersecting a second rectangular cylindrical passage, said passages formed perpendicular to each other, wherein said shaft extends through said first passage and said second passage has an open first end and a second end, the second end extending across and past the diameter of the first passage;

a resilient cylindrical sleeve having a closed first end and an open second end, wherein the second end of the sleeve is fixed to and axially aligned with the first end of the second cylindrical passage;

a clutch assembly fixed within the first passage wherein said webbing reel shaft axially extends through said clutch assembly;

a strap having a first end fixed to said housing, a flat portion extending across a section of said second passage, and a second end coiled about and fixed to said clutch assembly;

an actuator positioned within said circular cylindrical sleeve for acting upon the flat portion of the strap and tensioning said strap upon pretensioner activation;

a gas generant composition positioned intermediate of the actuator and the first end of said cylindrical sleeve; and an initiator fixed within the first end of said cylindrical sleeve for igniting said gas generant composition and closing the first end of the cylindrical sleeve, wherein upon receipt of a signal to the initiator, the gas generant composition is ignited to release sufficient force to drive the actuator through said cylindrical sleeve and through said second passage to the second end thereof, thereby effecting a tensioning of the strap and actuation of the clutch assembly, and then a simultaneous rotary advancement of the clutch assembly, the webbing reel shaft, and the webbing reel, thus winding the reel and tensioning the seatbelt webbing thereon.

7. A pretensioner cooperating with a webbing reel shaft of a seatbelt retractor webbing reel, that upon activation pretensions the seatbelt webbing associated therewith, the pretensioner comprising:

a housing having a first passage volumetrically intersecting a second linear passage, said passages formed perpendicular to each other, wherein said shaft extends through said first passage and said second passage has a first end and a second end, the second end extending across and past the diameter of the first passage;

a clutch assembly fixed within the first passage wherein said webbing reel shaft axially extends through said clutch assembly;

a strap having a first end fixed to said housing, a portion extending across a section of said second passage, and a second end coiled about and fixed to said clutch assembly;

an actuator positioned within the first end of said second passage for tensioning said strap upon pretensioner activation; and a gas generant composition, ignitable to release sufficient force to drive the actuator through said second passage to the second end thereof, thereby effecting a tensioning of the strap and a peripheral force about the clutch assembly, and then a simultaneous rotary advancement of the clutch assembly, the webbing reel shaft, and the webbing reel, and thus winding the reel and tensioning the seatbelt webbing thereon.

8. A pretensioner cooperating with a webbing reel shaft of a seatbelt retractor webbing reel, that upon activation pretensions the seatbelt webbing associated therewith, the pretensioner comprising:

a housing having a first passage volumetrically intersecting a second linear passage, said passages formed perpendicular to each other, wherein said shaft extends through said first passage and said second passage has an open first end and a second end, the second end extending across and past the diameter of the first passage;

a resilient cylindrical sleeve having a closed first end and an open second end, wherein the second end of the sleeve is fixed to and axially aligned with the first end of the second linear passage;

a clutch assembly fixed within the first passage wherein said webbing reel shaft axially extends through said clutch assembly;

a strap having a first end fixed to said housing, a flat portion extending across a section of said second passage, and a second end coiled about and fixed to said clutch assembly;

an actuator positioned within said cylindrical sleeve for acting upon the flat portion of the strap and tensioning said strap upon pretensioner activation;

a gas generant composition positioned intermediate of the actuator and the first end of said cylindrical sleeve; and an initiator fixed within the first end of said cylindrical sleeve for igniting said gas generant composition and closing the first end of the cylindrical sleeve, wherein upon receipt of a signal to the initiator, the gas generant composition is ignited to release sufficient force to drive the actuator through said cylindrical sleeve and through said second passage to the second end thereof, thereby effecting a tensioning of the strap and actuation of the clutch assembly, and then a simultaneous rotary advancement of the clutch assembly, the webbing reel shaft, and the webbing reel, thus winding the reel and tensioning the seatbelt webbing thereon.

* * * * *